N. D. LEVIN.
ELECTRIC MOTOR.
APPLICATION FILED MAR. 26, 1914.
1,157,945.
Patented Oct. 26, 1915.
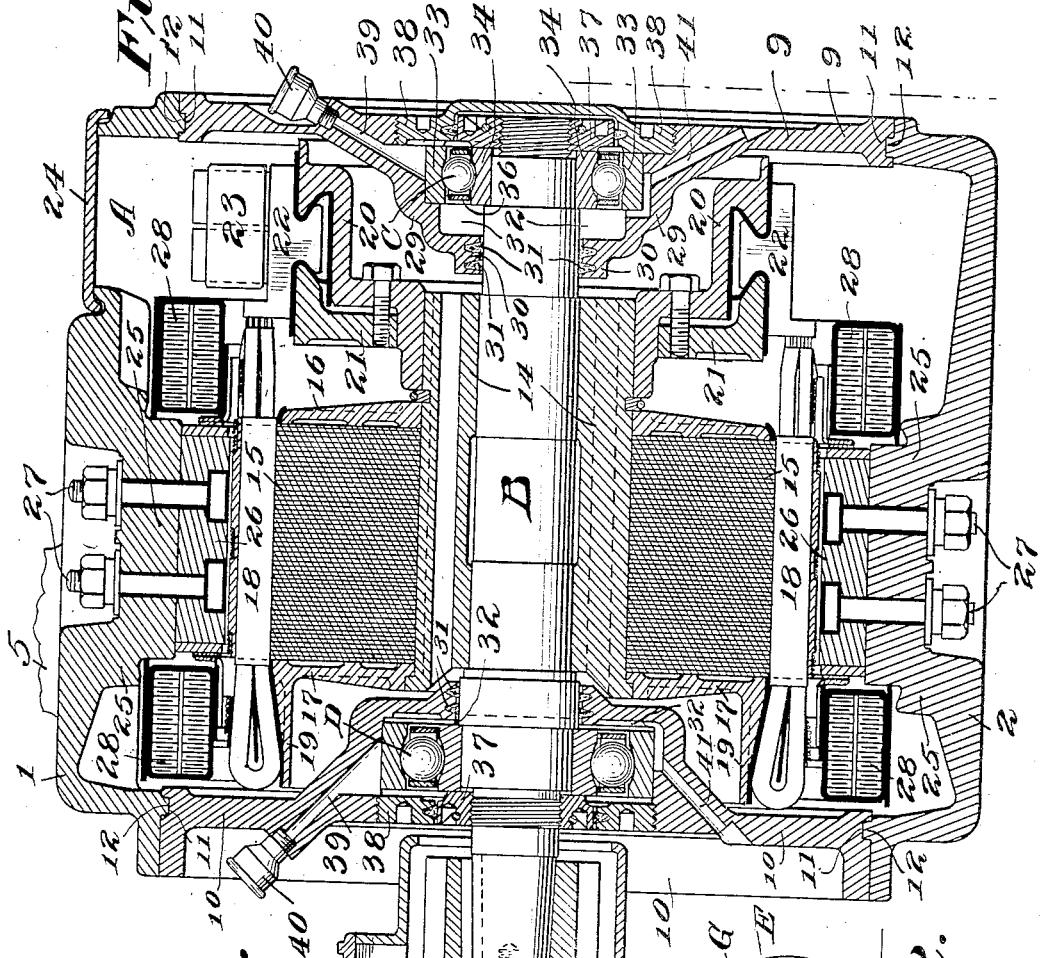
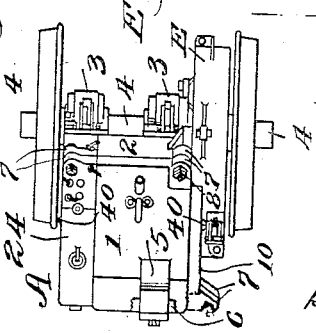
Witnesses:
H. H. Lybrand
S. Jay Teller
Inventor,
Nils D. Levin,
By H. H. Bliss Attorney

UNITED STATES PATENT OFFICE.

NILS DAVID LEVIN, OF COLUMBUS, OHIO, ASSIGNOR TO THE JEFFREY MANUFACTURING COMPANY, OF COLUMBUS, OHIO, A CORPORATION OF OHIO.

ELECTRIC MOTOR.

1,157,945.  Specification of Letters Patent.  Patented Oct. 26, 1915.

Application filed March 26, 1914. Serial No. 827,433.

*To all whom it may concern:*

Be it known that I, NILS D. LEVIN, a citizen of the United States, residing at Columbus, in the county of Franklin and State of Ohio, have invented certain new and useful Improvements in Electric Motors, of which the following is a specification, reference being had therein to the accompanying drawing.

This invention relates primarily to railway electric motors of the class in which each has its rotating armature shaft supported by roller bearings, usually ball bearings.

In motors of the class to which the invention especially relates the space which is available longitudinally of the shaft is very limited, and the bearings must be set very close respectively to the rotating armature coils and commutator and these rotating parts must be kept free from lubricant. Prior to my invention much difficulty has been experienced in effecting a proper lubrication of the bearings and in, at the same time, preventing any of the lubricant from entering the main motor chamber and coming into contact with the coils and with the surface of the commutator. When a freely flowing fluid lubricant was used it was found to be practically impossible, even when special packing rings were provided, to prevent some of the oil from working its way into the interior; and when use was made of a heavy "solid" lubricant, great difficulty was experienced in forcing such lubricant into the interstices of the ball bearings, the pressure applied for that purpose causing the lubricant to be forced past the packing rings into the interior of the motor.

The principal object of this invention is to provide means whereby use may be made of "solid" lubricant without experiencing the difficulty referred to, namely, uncertainty as to the lubricant reaching the interior of the ball bearings and the forcing of lubricant along the shaft into the interior of the motor.

Other objects will be apparent from the following specification.

Referring to the drawings—Figure 1 is a cross-sectional view through a motor embodying my invention, the section being taken along the line 1—1 of Fig. 2; Fig. 2 is a side elevation of the motor and the car or locomotive axle and other parts of which it is associated. In this view one of the wheels is not shown in order that the motor and gear casing may be shown more clearly; Fig. 3 is a plan view of the parts shown in Fig. 2.

Referring to the drawings, the numerals 1 and 2 indicate respectively the upper and lower halves of a divisible motor casing, indicated in general by the letter A. The motor, as illustrated, is of the railway type in which the casing is provided at one side with journal boxes 3, 3, through which passes the locomotive axle 4. The casing is supported and held in position by the journals 3, 3 and a bracket 5, extending upward from the upper half of the casing and secured to a transverse bar 6 on the truck frame. The power is transmitted from the motor to the axle by means of the pinion P secured to the armature shaft of the motor and the gear G secured to the axle. The pinion and the gear are inclosed in a casing E. The line of division between the two halves of the casing A is in a plane passing axially of the motor slightly above the center line of the shaft and at approximately forty-five degrees to the horizontal. Lugs 7 extend outward from the two sections and are provided with holes through which pass the fastening bolts 8.

The end sections 9, 10 of the motor are separable from the main casing, as best illustrated in Fig. 1. The end sections are circular in form and are provided at their peripheries with grooves 11 into which fit the annular tongues 12 extending inward from the openings in the ends of the casing.

The shaft B, carrying the armature spider 14, is supported in bearings C and D, carried by the separable end walls 9, 10. The armature laminations 15 are secured between the two collars 16 and 17 upon the spider 14 and carry the armature windings 18 disposed in any of the well known forms. The periphery of the collar 17 is extended axially away from the center of the armature in the form of a drum 19, which supports the ends of the armature windings and permits their extending in close proximity to the removable end wall 10. At the other end of the motor commutator carrying and clamping rings 20 and 21 are secured upon the armature spider 14, being spaced away from the armature shaft and extending in close proximity to the inner face of the end wall 9. The armature windings 18 are secured at the commutator end to the segments 22 which are held in place by the rings 20 and 21 and the commutator brushes 23 are mounted in the frame and contact with the commutator segments. A cap or cover 24 is detachably secured on the top of the frame directly over the commutator so as to permit of its inspection.

The motor is of the box type in which the field comprises the motor casing and the type illustrated is provided with four inward extending pole pieces 25, to which are secured laminated poles 26, by means of bolts 27. The field coils 28 surround the poles 26 and may be secured in position by any of the well known methods.

As previously stated, the armature shaft B is carried by roller or ball bearings C and D mounted at each end in the removable end pieces 9 and 10. The end section 9, which is positioned at the commutator end of the motor, is provided with an inward extending annular cup-shaped bearing housing and support 29, which extends within the space between the motor shaft and commutator carrying ring 20, terminating in a ring 30. In the ring 30 are cut annular grooves 31 in which are positioned packing rings for preventing the flow of lubricant along the shaft. The inward extending support 29 is formed with three steps of varying diameters. Directly outside of the ring 30 an increase of the diameter of the opening in the support 29 forms a chamber 32. Directly outside of this the diameter is again increased to receive the outer raceway ring 33 of the bearing C, the inner raceway ring 34, of which is secured on the shaft B. The balls 35 are disposed between the two raceway rings and are held in position and spaced from each other by the cage 36. The inner raceway ring 34 is held in place by the collar 37 which has threaded engagement with the end of the shaft B. The opening in the support 29 is further enlarged from the diameter of the chamber receiving the bearing C to provide a third or outer recess which is threaded to receive a cap or collar 38. This cap has threaded engagement with the periphery of the recess and when secured into place abuts against the outer face of the raceway 33 and secures it in position. The cap covers the end of the shaft and serves to prevent the escape of lubricant.

The bearing D at the other end of the shaft is similar to the bearing C already described, and it is similarly mounted. In this case, however, the part 38 is in the form of a collar which surrounds, but does not cover, the end of the shaft. The shaft extends through the collar and carries the aforesaid pinion P.

Each of the end sections 9 and 10 of the motor casing is provided with a downward and inward inclined lubricant duct 39 which communicates at its lower inner end with the corresponding bearing C and D. At the upper outer end of each lubricant duct 39 is a grease or lubricant cup 40 of the pressure type. When the cup is filled with solid lubricant, the lubricant can be forced out of the cup and into and through the duct 39 by turning the cap of the cup. In this way the lubricant can be supplied from time to time to keep the bearings C and D in proper running condition. Communicating with the space 32 for each bearing there is a duct or passageway 41 which extends downward and outward through the end section 9 or 10. Each duct 41 serves to keep the corresponding chamber 32 at atmospheric pressure. It will be observed therefore, that when the lubricant is forced through the ducts 39 by the pressure of the grease cups 40, there will be a flow of lubricant through the ball bearings between the races and the balls, thereby insuring perfect lubrication, and as there is a free opening through the ducts 41 to the outside atmosphere, it will be impossible to produce sufficient pressure in the chambers 32 to cause the lubricant to pass the packing rings 31 into the interior of the motor.

What I claim is:

1. In an electric motor, the combination of the motor casing, the rotating armature shaft extending through the casing the bearing housings being external to the casing, the bearings for the shaft located respectively in the said housings, the pressure devices for forcing lubricant into the bearings, and the ducts connecting the interiors of the said housings with the external air, whereby the building up of pressure in the housings by the pressure devices is prevented.

2. In an electric motor, the combination with the motor casing, the rotating armature shaft and the two ball bearings for the shaft, of the supports 29 for the bearings each having the chamber 32, the ducts 39 communicating respectively with the bearings, the pressure cups 40 at the ends of the ducts respectively, and the ducts 41 connecting the chambers 32 respectively with the external atmosphere.

3. In an electric motor, the combination of the motor casing, the rotating armature shaft extending through the casing, the bearing housing external to the casing, the bearings for the shaft located respectively in the said housings, the pressure devices for forcing lubricant through the interstices of the bearings, and ducts connecting the interiors of said housings with the external air whereby the building up of pressure in the inner side of the housing by the pressure devices is prevented.

4. In an electric motor, the combination with the motor casing, of ball bearings supported by the casing, an armature shaft journaled in the ball bearings, chambers in the casing adjacent the outer sides of the ball bearings, pressure devices connected with the chambers by which lubricant may be forced into the chambers, other chambers in the casing adjacent the inner sides of the ball bearings, ducts connecting the last mentioned chambers with the outer air to carry away lubricant which passes through the ball bearings to prevent the building up of pressure in these chambers by the pressure devices as and for the purpose set forth.

5. In an electric motor, the combination with the motor casing, of ball bearings supported by the casing, an armature shaft journaled in the ball bearings, chambers in the casing adjacent one side of each of the ball bearings, pressure devices connected with the chambers by which lubricant may be forced into the chambers, other chambers adjacent the other sides of each of the ball bearings, ducts connecting the last mentioned chambers with the outer air to carry away lubricant passing through the ball bearings to prevent the building up of pressure in these chambers by the pressure devices as and for the purpose set forth.

6. In a ball bearing housing, the combination of a ball bearing supported by the housing, a shaft supported in the ball bearing, a chamber in the housing adjacent the ball bearing, pressure device connected with the chamber by which lubricant may be forced into the chamber, a second chamber adjacent the other side of the ball bearing, a duct connecting the second chamber with the outside air to carry away lubricant passing through the ball bearing to prevent the building up of pressure in this chamber by the pressure device, as and for the purpose set forth.

In testimony whereof, I affix my signature, in presence of two witnesses.

NILS DAVID LEVIN.

Witnesses:
F. E. MILLER,
DUDLEY T. FISHER.